United States Patent
Oyobe et al.

[11] Patent Number: 5,262,365
[45] Date of Patent: Nov. 16, 1993

[54] QUARTZ GLASS DOPED WITH RARE EARTH ELEMENT AND PRODUCTION THEREOF

[75] Inventors: Akira Oyobe, Chiba; Kazunori Nakamura; Nobuyuki Kagi, both of Yokohama; Yasumasa Sasaki, Tokyo, all of Japan

[73] Assignee: The Furukawa Electric Co., Ltd., Tokyo, Japan

[21] Appl. No.: 778,062

[22] PCT Filed: Feb. 5, 1991

[86] PCT No.: PCT/JP91/00134
§ 371 Date: Dec. 5, 1991
§ 102(e) Date: Dec. 5, 1991

[87] PCT Pub. No.: WO91/11401
PCT Pub. Date: Aug. 8, 1991

[30] Foreign Application Priority Data

Feb. 5, 1990 [JP] Japan .................... 2-25613
Mar. 15, 1990 [JP] Japan .................... 2-65150

[51] Int. Cl.$^5$ .............................. C03C 13/04
[52] U.S. Cl. ........................ 501/54; 501/55; 501/37; 501/900; 65/DIG. 16; 65/301; 65/30.13
[58] Field of Search ........... 501/64, 68, 54, 37, 501/900; 65/DIg. 16, 30.1, 30.13

[56] References Cited

U.S. PATENT DOCUMENTS

| | | | |
|---|---|---|---|
| 2,982,053 | 5/1961 | Elmer | 501/54 |
| 3,895,073 | 7/1975 | Lamparsky et al. | 260/586 F |
| 4,110,093 | 8/1978 | Macedo et al. | 65/3 |
| 4,110,096 | 8/1978 | Macedo et al. | 65/30 R |
| 4,798,681 | 1/1989 | Oversluizen et al. | 501/64 |

FOREIGN PATENT DOCUMENTS

232815 8/1987 European Pat. Off. ............. 507/37
286626 8/1988 European Pat. Off. .
2100456 5/1987 Japan .

Primary Examiner—Mark L. Bell
Assistant Examiner—C. M. Bonner
Attorney, Agent, or Firm—Jacobson, Price, Holman & Stern

[57] ABSTRACT

Rare earth element doped silica glass according to the invention is prepared by doping silica-based glass co-doped with a rare earth element and aluminum additionally with fluorine and has excellent physical properties including remarkable light emission characteristics and an excellent capability of being fused with other silica-based glass. Such doped silica glass provides high amplification gains and a wide wavelength bandwidth and therefore can be used as a material for manufacturing miniaturized optical devices. Particularly, since the manufacturing process adapted to produce rare earth element doped silica glass according to the invention does not involve crystallization that normally characterizes the type of doped silica glass under consideration, the obtained doped silica glass is transparent and totally free from air bubbles. As a method for manufacturing rare earth doped silica glass according to the invention combines means for producing articles made of porous glass and a solution impregnation method, it provides easy and effective means for manufacturing rare earth doped silica glass which is co-doped with both a rare earth element and aluminum and highly transparent and therefore can be used as a suitable material for active optical devices.

13 Claims, 3 Drawing Sheets

QUARTZ GLASS DOPED WITH RARE EARTH ELEMENT AND PRODUCTION THEREOF

BACKGROUND OF THE INVENTION

1. Field of the Invention

This invention relates to rare earth element doped silica glass and more particularly it relates to rare earth element doped silica glass to be suitably used for active optical devices as well as a method for manufacturing the same.

2. Prior Art

Known papers that deal with so-called functional optical fibers having a core of a rare earth element include the following.

Paper No. 1: C. J. Koester and E. Snitzer, Appl. Opt., 3,1182 (1964).

Paper No. 2: S. B. Poole et al., Electron. Lett. 21, p. 738 (1985)

Paper No. 3: R. J. Mears et al., Electron. Lett. 23, p. 10,26 (1987)

Paper No. 4: E. Desurvire et al, Opt. Lett. 12.888 (1987)

The first two papers address fiber laser utilizing light amplification achieved by stimulated emission of excited rare earth elements, while the rest of the papers concentrate on light amplifiers to be prepared by using the technology of fiber laser.

It has been found that optical fibers doped with erbium, a rare earth element, provide a particularly advantageous material for optical amplifiers because optical amplifiers using such optical fibers do not require light-electricity (O/E, E/O) conversion as they can effectively amplify the intensity of light around the wavelength of 1.55 μm currently used for optical communication systems.

However, rare earth element doped functional glass fibers using $SiO_2$ glass or $GeO_2$-$SiO_2$ glass as a host glass are accompanied by certain disadvantages, which will be described below.

Firstly, rare earth elements cannot be added to glass of this type too much to attain a high concentration level since highly concentrated ions of a rare earth element tends to extinguish the light emission of their own.

This phenomenon, so-called concentration quenching, is due to non-radiative decay process caused by clustered ions of the rare earth element in the glass to reduce the life time and the efficiency of the emission.

Secondly, optical amplifiers using rare earth element doped, or particularly erbium doped, optical fibers have a very narrow light emission spectrum and hence operate satisfactorily only for a limited wavelength bandwidth.

In an attempt to avoid this problem, there has been proposed a method of co-doping glass with both aluminum and a rare earth element in a paper shown below.

Paper No. 5: K. Arai et al., J. Appl. Phys., 59.3430 (1988)

The technique disclosed in this paper can provide glass doped with a rare earth element to a relatively high ion concentration without causing the phenomenon of clustering.

Glass co-doped with both a rare earth element and aluminum to achieve high ion concentration of a rare earth element offers the following advantages.

Firstly, it brings forth a sufficient amplification gain if the distance allowed for interaction of pump light and ions of a rare earth element is short. This leads to realization of a compact laser or optical amplifier.

Secondly, changes can occur in the light emission spectrum of ions of a rare earth element by co-doping of aluminum and the element.

More specifically, the light emission spectrum of erbium doped silica glass can be broadened by aluminum co-doping for a wavelength band around 1.55 μm so that an optical amplifier that accommodates a broad wavelength bandwidth can be realized.

This provides a particularly favorable advantage when rare earth element doped silica glass is used for optical amplifiers in wavelength-division-multiplex transmission systems.

Currently available methods for preparing glass preforms to be used for optical fibers which are co-doped with both a rare earth element and aluminum include so-called MCVD solution impregnation method that has been developed from MCVD method and disclosed in a paper shown below.

Paper No. 6: B. J. Ainslie et al., Mater. Lett. 6,139 (1988)

According to this paper, glass having a lower refractive index is deposited on the inner peripheral surface of a silica glass tube by means of an ordinary MCVD method to form a clad glass layer there and then porous glass is deposited on the inner surface of the clad glass layer to form a core glass layer by means of MCVD method conducted at relatively low temperature. Thereafter, a rare earth element and aluminum in solution are introduced into the pores of the core-forming porous glass layer until they are saturated with the solution.

The solution-impregnated and core-forming porous glass layer is then dried, dehydrated and sintered in a helium gas flow to make it non-porous (transparent vitrification). Thereafter, the obtained silica glass tube having a clad glass layer and a core glass layer is collapsed by known technique to produce a solid rod-shaped optical fiber preform.

Reportedly, a rare earth element can be added to silica glass by more than 3 wt % without clustering ions of the element in the glass.

The MCVD solution impregnation method as described above provides an advantage that oxygen-hydrogen flames can be used to effectively heat the silica glass tube (substrate) that plays the role of a reactor tube to a temperature where the high melting point crystal phase in the doped glass layer disappears, that no cracks are produced by thermal stress if the doped glass is crystallized in the sintering stage because the crystallized glass can be subjected to a collapsing process at or above 1,900° C. without a cooling step and that the crystal phase in the doped glass is completely wiped out during the collapsing process and transparent glass preforms of optical fibers can be obtained by rapidly cooling the glass immediately after the collapsing process.

On the other hand, the above described MCVD solution impregnation method is accompanied by a drawback that homogeneous and optically excellent glass preforms cannot be formed to large dimensions because clad and core glass layers are deposited on the limited inner space of a tube.

The technique of solution impregnation has been known for long for doping and popularly used in recent years for doping using rare earth elements and transition metals that can hardly be added to glass by means of an ordinary vapor phase method.

Improved solution impregnation methods are disclosed in the following documents (1), (2) and (3).
(1) U.S. Pat. No. 3,895,073: P. C. Schultz (1975)
(2) U.S. Pat. No. 4,110,093: P. B. Macedo (1975)
(3) U.S. Pat. No. 4,110,096: P. B. Macedo (1978)

Unlike MCVD method, on the other hand, a so-called outside process involving VAD method, OVD method, sol-gel method, powder molding method or slip cast method has an advantage that it can produce homogeneous and optically excellent glass preforms having large dimensions because it is not by any means restricted by the size of the substrate tube of the preform.

Thus, an outside process may be suitably used to produce rare earth element doped glass laser rods that have a high output capacity and are free from restrictions concerning the shape and size of the glass rod and therefore applied to the manufacture of functional optical waveguides.

For these reasons, porous and vitreous preforms to which dopants are added by means of a solution impregnation method and which are prepared by means of an outside process may offer a wide spectrum of applications.

The inventors of the present invention have conducted a number of experiments to find out if a VAD solution impregnation method is feasible for aluminum doping just as an MCVD solution impregnation method is. Some of the results of the experiments will be described below.

Experiment 1

A certain number of pure silica porous and glass preforms prepared by means of VAD method and having a bulk density of 0.4 to 0.5 g/cm$^3$ were immersed in methyl alcohol solutions containing aluminum chloride at various concentrations for 12 to 24 hours for impregnation.

After completion of the impregnation process, the solvent in the porous glass preforms was evaporated and removed from them so that the aluminum salt in the solutions was deposited on the pores of the preforms. Then, the porous preforms were heated in an oxygen gas flow to approximately 950° C. in order to oxidize and fix the aluminum salt on the preforms.

The amount of $Al_2O_3$ thus obtained and fixed to the preform samples was between 0.3 and 3 wt % of the overall weight of the dried preforms.

Thereafter, the preform samples were fed into a vertical electric furnace having a muffle tube filled with helium gas containing $Cl_2$ by 1 vol % and $O_2$ by 5 vol % and heated to 1,500° C. at the center and moved through the heat zone of the electric furnace for sintering.

After sintering, it was found that the preforms had not been completely consolidated and cracks became apparent as the preforms were cooled.

In particular, the preforms that had been impregnated with aluminum up to a high concentration level showed voids within them.

When tested for X-ray diffraction, they did not show a halo pattern which is characteristic of a glass phase and it was found that the glass phase of the samples had transformed into a high melting point crystal phase involving crystobalite ($SiO_2$) and mullite ($3Al_3.2SiO_2$) as illustrated in FIG. 1.

The porous preforms that had been co-doped with both aluminum and erbium were not consolidated either and consequently no transparent glass was produced in the preforms.

Experiment 2

Porous $P_2O_5$—$SiO_2$-type preforms having a bulk density of 0.4 to 0.5 g/cm$^3$ and containing $P_2O_5$ by only 1.1 wt % were prepared by the VAD method. prepared by the VAD method.

The preforms were then immersed in solutions containing aluminum at different concentrations and then subjected to drying, oxidizing and sintering processes under conditions which were identical with those of Experiment 1 as described above.

The preform samples of Experiment 2 were not totally free from pores either after sintering and cracks were observed on them when they were cooled, although the cracks were not so remarkable as their counterparts on the samples of Experiment 1.

When tested for X-ray diffraction, the samples did not show halos and were crystallized in high melting point phases of crystobalite and aluminum phosphate ($AlPO_3$).

The preforms that had been co-doped with both aluminum and erbium did not produce transparent glass in them.

Erbium phosphate ($ErPO_3$) was deposited on the preforms that had been impregnated with erbium to high concentration levels as illustrated in FIG. 2.

The reason why the VAD solution impregnation method used for Experiments 1 and 2 was not successful in producing transparent glass is apparently that the glass sintering temperature of this VAD-based method is lower than that of a MCVD-based method.

In other words, the process of glass sintering is blocked by the formation of high melting point phases.

An established phase diagram for an $Al_2O_3$—$SiO_3$ system shows that the eutectic point of mullite and crystobalite is 1,587°±10° C. and that, on the silica side above the eutectic composition ($Al_2O_3=8$ wt %), the liquidus curve is found between the eutectic point and 1,726° C. which is the melting point of crystobalite.

This means that the mullite and crystobalite that have been deposited will never melt at 1,500° C., which was the sintering temperature in Experiment 1.

The substances in the high melting point phase have to be sintered at a temperature higher than 1,587° to 1,726° C. if they should disappear.

While there have not been established phase diagrams for an $Al_2O_3$—$P_2O_5$—$SiO_3$ system, it may be safely assumed that its physical characteristics are similar to those of an $Al_2O_3$—$SiO_3$ system described for Experiment 1.

In a $P_2O_5$—$SiO_3$ system, for instance, the liquidus curve (showing the temperature where crystobalite disappears) is found above 1,700° C. if the $P_2O_5$ content is equal to 1.1 wt %. In an $Al_2O_3$—$P_2O_5$ system, on the other hand, the liquidus curve (showing the temperature where $AlPO_4$ disappears) is found above 1,700° C. if the $Al_2O_3$ content exceeds 30 wt %.

In order to confirm the above statement, the preforms obtained in Experiments 1 and 2 were strongly heated in oxygen-hydrogen flames and then rapidly cooled. While the samples were vitrified and became transparent, they contained a large number of air bubbles and were not feasible for optical applications.

As is apparent from the results of the experiments as described above, a VAD solution impregnation method cannot produce satisfactory doped silica glass, be it doped with only aluminum or co-doped with both aluminum and a rare earth element because of its low sintering temperature.

any attempt to raise the sintering temperature above 1,600° or 1,700° C. may not be feasible for technological reasons and in view of available facilities.

Particularly, it should be noted that muffle tubes and jigs made of fused silica and used in furnaces for sintering porous glass preforms can be softened and deformed at such high temperature and readily lose the service life.

While this problem may be avoided by replacing the fused silica muffle tube with a tube made of a ceramic material having a high melting point, such a ceramic material can be volatilized at high temperature and eventually contaminate the preforms being doped in the tube to make the optical fibers made from the preforms apt to bring forth a large transmission loss while they are in service.

It should be also noted that preforms which are sintered at a temperature higher than the level of the above described liquidus curve can melt and fall down in drops by their own weight.

These problems are commonly observed in a VAD solution impregnation method and various outside processes such as OVD method.

SUMMARY OF THE INVENTION

It is, therefore, an object of the present invention to provide doped silica glass that can become completely transparent at relatively low sintering temperature and effectively bypass the problem of crystallization which is specific to silica glass co-doped with a rare earth element and aluminum.

Another object of the present invention is to provide doped silica glass containing a rare earth element to a high concentration level and still having excellent light emission characteristics.

Still another object of the present invention is to provide a solution impregnation method based on an outside process for manufacturing doped silica glass which is co-doped with both a rare earth element and aluminum and, more particularly, highly pure and transparent doped silica glass to be suitably used for functional optical fibers and light waveguides.

According to the invention, there is provided rare earth element doped silica glass realized by additionally doping $SiO_2$ host glass which is co-doped with both aluminum and fluorine with a rare earth element.

The host glass may contain a refractive index raising substance and/or a glass softening temperature lowering substance for the purpose of the present invention.

According to the invention, there is also provided rare earth element doped silica glass realized by additionally doping $GeO_2$—$SiO_2$ host glass which is co-doped with both aluminum and fluorine with a rare earth element.

The host glass preferably contain fluorine approximately by 0.1 to 1.5 wt %.

When $GeO_2$—$SiO_2$ host glass is used, it preferably contain $GeO_2$ approximately by less than 20 wt %.

Examples of the rare earth element to be used for additionally doping the host glass include erbium and neodymium.

The host glass preferably contains a rare earth element to a concentration level of approximately less than 40,000ppm by weight and aluminum to a concentration level of approximately less than 80,000ppm by weight.

When the host glass is doped with erbium, the erbium concentration is preferably between 30 and 1,500ppm by weight, while the aluminum concentration is preferably between 500 and 15,000ppm by weight.

When optical waveguides are formed from rare earth element doped silica glass of the above described type, those portions of the glass that contain the rare earth element are advantageously used.

According to the invention, there is also provided a method for manufacturing rare earth element doped silica glass comprising steps of impregnating a porous glass preform with a rare earth element and aluminum by immersing the preform in a solution containing ions of a rare earth element and aluminum, drying said preform while causing the salts of the rare earth element and aluminum to deposit in the pores of the preform and, if necessary, oxidizing the deposited salts for stabilization and sintering the porous glass preform after the drying step to consolidate the preform, characterized in that said method further comprises a fluorine doping step after said drying step and before completion of consolidation of the preform in the sintering step where the porous glass pre form is heated and doped with fluorine in a fluorine containing atmosphere.

A method for manufacturing rare earth element doped silica glass according to the invention as described above may additionally comprise a dehydrating step where said porous glass preform is dehydrated in a chlorine gas and oxygen containing atmosphere.

The fluorine doping step of a method for manufacturing rare earth element doped silica glass according to the invention is preferably conducted in a fluorine containing atmosphere at a temperature lower than the sublimation temperature of aluminum fluoride.

A porous glass preform to be used for the purpose of a method for manufacturing rare earth element doped silica glass according to the invention may be prepared by means of a vapor phase method such as VAD method or OVD method or alternatively by means of a sol-gel method, a powder molding method or a split cast method.

Rare earth element doped silica glass according to the invention has a composition which is generally expressed by a glass matrix of a $R_2O_3$—$Al_2O_3$—$SiO_2$—F system (wherein R represents a rare earth element and fluorine doping is conducted by substituting the oxygen of the system with fluorine) and contains silica to an enhanced density and no alkaline metals at all.

Thus, rare earth element doped silica glass according to the invention has a thermal expansion coefficient, a softening temperature and other physical properties which are close to those of silica-based glass of a type popularly used for optical fibers.

So, an optical fiber or optical waveguide having a core-clad structure can be easily prepared by using rare earth element doped silica glass according to the invention for the core and glass having a refractive index lower than that of the former such as F-doped silica for the clad.

Optical fibers made of rare earth element doped silica glass according to the invention can be readily connected with ordinary silica-based fibers by fusion splicing.

Moreover, rare earth element doped silica glass according to the invention can contain a rare earth element to an enhanced concentration level without adversely affecting the light emission characteristics under the effect of coexistence of ions of a rare earth element and those of aluminum. Therefore, it brings forth a sufficient amplification gain if the distance allowed for interaction of excited light and ions of the rare earth element is short. This leads to realization of a compact laser or optical amplifier.

Rare earth element doped silica glass according to the invention provides a particularly favorable material for optical amplifiers when the rare earth element is erbium because an optical amplifier made of such a material shows a broadened effective bandwidth around 1.55 $\mu$m under the effect of coexistence of erbium and aluminum ions.

While these advantageous effects of rare earth element doped silica glass according to the invention are similar to known silica-based glass which is co-doped with both a rare earth element and aluminum, the former has additional advantages because of its novel composition involving fluorine.

Since the host glass to be used for manufacturing rare earth element doped silica glass according to the invention contains fluorine, the tendency of crystallization that the silica-based glass co-doped with a rare earth element and aluminum characteristically has is significantly suppressed by the fluorine in the glass.

It has been known that, while the rare earth element content and the aluminum content of silica-based glass act to raise the refractive index of the glass, its fluorine content serves to lower the refractive index.

Therefore, the refractive index of the doped glass may become lower than that of silica glass and too low to ensure a sufficient difference between the refractive index of the glass core and that of the glass clad of an optical fiber prepared by using such glass depending on the concentration levels of the dopants in the glass.

If such is the case, the problem can be resolved by simply increasing the content of a dopant that serves to raise the refractive index of the doped glass.

More specifically, AlF$_3$ has a melting point of 1,040° C. and a sublimating point of 1,276° C., whereas ordinary silica-based porous glass preforms are sintered between 1,300° and 1,600° C.

So, if porous glass preforms containing the above dopant are sintered within the above described temperature range, the AlF$_3$ dopant can be largely volatilized and dissipated to reduce the level of aluminum content in the sintered products.

Then, a dopant that serves to lower the softening temperature of the doped glass can be further added to modify the glass matrix to accelerate the rate of consolidation of the porous glass preforms being sintered and consequently reducing the rate of volatilization and dissipation of AlF$_3$ to keep the aluminum content of the sintered products as much as possible.

GeO$_2$ or P$_2$O$_5$ is advantageously used for the above described dopant.

Either of these doping substances can significantly enhance the refractive index of the material doped with it and, at the same time, lower the vitrification temperature (softening temperature) of the material.

Of these, GeO$_2$ is particularly effective for raising the refractive index of glass while P$_2$O$_5$ can effectively lower the softening temperature of glass, both being feasible as dopants to be added to porous glass in a process involving either VAD method or OVD method.

The fluorine concentration in rare earth element doped silica glass according to the invention in order to effectively suppress the tendency of crystallization of the glass is normally found between 0.1 and 1.5 wt %, although the proportion depends on the aluminum content in the glass.

When the fluorine concentration is smaller than 0.1 wt %, it hardly show any effect of suppressing the tendency of crystallization, whereas a too large proportion of fluorine in glass can result not only in an undesirable drop of refractive index of the glass but also in generation of air bubbles in the interface of the core glass and the clad glass of a preform.

It is known that the thermal expansion coefficient of silica based glass rises with the increase of aluminum concentration.

The additional GeO$_2$ or P$_2$O$_5$ also raises the thermal expansion coefficient of the doped silica glass.

Therefore, if glass containing GeO$_2$ or P$_2$O$_5$ to a disproportionally large extent is used for cores of optical fiber preforms, they can be damaged and broken by thermal stress that can be generated between the core and the clad.

In view of this possible problem, it is recommendable that the content of the added GeO$_2$ in the glass is held equal to or lower than approximately 20 wt % and the P$_2$O$_5$ content is held equal to or lower than approximately 10 wt %.

It should be noted, however, that the above limits are not applicable to rare earth element doped silica glass according to the invention and the dopants may be used to a larger extent if the glass is used for products which are made only from it such as glass laser rods.

A solution impregnation method that uses porous glass preforms for producing doped silica glass containing silica to a high concentration level and no alkaline metals and co-doped with both a rare earth element and aluminum may be a simple method that can effectively regulate the dopant concentration and therefore find various applications.

However, as described above by referring to the experiments conducted by the inventors of the present invention employing a VAD solution impregnation method, porous glass preforms can hardly be consolidated if the solution impregnated preforms are sintered without passing through a step of fluorine doping because of the existence of high melting point crystal phase in them.

On the contrary, if porous glass preforms are doped with a rare earth element and aluminum and additionally with fluorine, they can be consolidated and turn themselves into transparent glass at relatively low temperature below 1,500° C.

This favorable phenomenon may be explained in the following way.

Firstly, the viscosity of the silica-based glass particles of porous preforms must be reduced by the fluorine doping.

As a result, the preforms can be sintered quickly to accelerate the rate of diffusion of atoms of the rare earth element and aluminum and that of homogenization of the preforms.

Secondly, oxides of the rare earth element and aluminum must react with fluorine to become fluorides having relatively low melting points as listed in Table 1.

When porous glass preforms are impregnated with a rare earth element and/or aluminum to a high concentration level, the dopants may not be sufficiently diffused within the glass particles and consequently the preforms may not be satisfactorily homogenized and lose their transparency. However, if such porous glass preforms are impregnated additionally with fluorine, their composition shows a glass matrix which is completely free from pores and contains only a small amount of crystalline particles evenly dispersed in it and therefore the preforms immediately regain their transparency once they are strongly heated in oxygen-hydrogen flames.

No cracks will be produced and no air bubbles will remain in the preforms during and after the heat treatment process.

Therefore, a glass composition as prescribed by the present invention can effectively suppress the tendency of crystallization specifically attributable to silica-based glass which is co-doped with both a rare earth element and aluminum and consequently the present invention makes it possible to prepare products of silica-based glass which is co-doped with both a rare earth element and aluminum, transparent and free from air bubbles even by using an outside process such as VAD solution impregnation method.

While it is known that phosphor (in the form of $P_2O_5$) can be used as a dopant that reduces the viscosity of silica glass, the use of silica glass doped with a rare earth element and aluminum and additionally with phosphor (without using fluorine) can produce high melting point crystalline substances such as crystobalite, aluminum phosphate and erbium phosphate in preforms as discussed earlier by referring to Experiment 2 and therefore is not feasible for the purpose of the present invention.

Rod-shaped glass preforms for rare earth element doped optical fibers can be typically prepared in the following manner by using a method for manufacturing rare earth doped silica glass according to the invention which is mainly based on VAD and solution impregnation techniques in this instance.

Firstly, porous silica glass preforms prepared by means of VAD method are immersed in a solution containing ions of a rare earth element and aluminum and then dried to evaporate the solvent and consequently deposit salts of the rare earth element and aluminum on the pores of the preforms.

The solution is normally an alcoholic or aqueous solution of chlorides, hydrochlorides and/or nitrates of the rare earth element and aluminum.

The impregnated porous preforms are preferably heated in an oxygen atmosphere prior to a sintering process.

While chlorides of the dopants are apt to evaporate and dissipate at relatively low temperature, they can be made stable by oxidization to secure the amount of the dopants to be consumed in the preforms.

Nitrates of the dopants are easily decomposed and oxidized around 200° C. and hence they do not require a particular oxidization process.

The atmosphere containing chlorine or gaseous chlorides and used for dehydration of the preforms prior to a sintering process preferably also contains oxygen ($O_2$).

The reason for this is that the oxidized dopants can be easily chlorinated in an atmosphere containing no oxygen to form chlorides of the dopants, which can readily evaporate and dissipate.

The impregnated preforms are then sintered in a helium atmosphere containing fluorine to consolidate.

Fluorides that can be used as sources for supplying fluorine include $SiF_4$, $SF_6$, Freon (trade name) and other commercially available fluorides.

The process of fluorine doping can be separated from and conducted independently before a sintering process.

For instance, porous glass preforms are doped with fluorine in a fluorine containing atmosphere below 1,273° C. which is the sublimation point of $AlF_3$ or preferably below 1,000° C. and subsequently sintered in a helium atmosphere containing oxygen which is heated to a temperature good for consolidating porous preforms.

With these procedure, the amount of $AlF_3$ which is dissipated and lost can be significantly reduced as compared with the case where preforms are doped with fluorine and sintered at the same time.

The problem of generation of cracks due to crystallization of glass in the process of manufacturing rare earth element doped silica glass can be effectively avoided by using a method according to the invention and described above and the net result will be production of silica-based glass rod which is co-doped with both a rare earth element and aluminum, transparent and free from air bubbles.

When optical fibers are prepared by using rare earth doped silica glass obtained in this manner for the cores of the optical fibers, firstly a porous clad glass layer of soot-like glass particles is formed on the outer periphery of each glass core by means of a flame hydrolysis deposition method, for instance, and then the porous clad glass layer is made into a transparent glass layer by a known technique to form an optical fiber preform, which is subsequently subjected to known processes for heating and drawing to produce rare earth doped optical fiber as a final product.

Methods feasible for preparing porous glass preforms for the purpose of the present invention include sol-gel method, powder molding method and split cast method as well as vapor phase methods such as VAD method and OVD method which are described above. Porous glass preforms prepared by a method other than VAD method can be handled for manufacturing rare earth doped optical fibers in an appropriate manner similar to the one as described above by referring to VAD method.

An MCVD solution impregnation method may also be used for the purpose of the present invention.

This method will be described below.

With an ordinary (known) MCVD method, a clad glass layer is formed on the inner peripheral surface of a silica glass tube by vapor phase deposition and then a porous glass core layer is formed on the inner peripheral surface of the clad glass layer also by vapor phase deposition at a temperature that does not make the porous core layers consolidated.

Vaporized source materials for dopants such as $GeCl_4$ or $POCl_3$ may be supplied with the silica source at this stage in order to add $GeO_2$ and $P_2O_5$ to the porous core glass layer.

Thereafter, the porous core glass layer is impregnated with a solution containing ions of a rare earth element and aluminum and then dried. If necessary, the dopants in the core glass layer are oxidized.

The above described procedures are substantially same as those of a conventional MCVD solution impregnation method.

Subsequently, a flow of helium gas containing gaseous fluorides is introduced into the glass tube while the latter is heated by flames from outside to dope the porous core glass layer with fluorine. Then, the composition of gas flow is replaced by helium containing $O_2$ and $Cl_2$ while the silica glass tube is continuously heated by flames from outside to consolidate the porous core glass layer.

Thereafter, the silica glass tube is collapsed by a known method to produce an optical fiber preform.

It should be noted that, while a conventional MCVD solution impregnation method does not involve fluorine doping, an MCVD solution impregnation method to be used for the purpose of the present invention necessarily comprises a step of fluorine doping.

This difference in the methods significantly affects the quality of the preform to be obtained as a final product. It will be described below.

With a conventional MCVD solution impregnation method, the helium gas flow used during the sintering process should contain a chlorine type dehydrating agent to a large extent in order to remove any hydroxyl groups that can adversely affect the transmission characteristics of the optical fiber. The use of a dehydrating agent at a high concentration level, by turn, can cause the aluminum with which the porous core glass layer is impregnated to be turned to $AlCl_3$ that can readily evaporate and dissipate by the high temperature of the sintering process.

With an MCVD solution impregnation method to be used for the purpose of the present invention, on the contrary, the porous core glass layer contains fluorine and therefore can be sintered at a temperature considerably lower than that of the known method to suppress dissipation and loss of aluminum.

Besides, the above method can reduce the time required for the sintering and collapsing steps in manufacturing rare earth doped silica glass according to the invention as core glass can be softened at relatively low temperature.

A method for manufacturing rare earth doped silica glass according to the invention can be applied for manufacturing planer optical waveguides as described below.

It is known that flame hydrolysis method, thermal CVD method and other methods may be used for preparation of porous silica glass films.

The reactions that take place in the process of manufacturing porous glass films by means of a flame hydrolysis method are similar to those involved in VAD method or OVD method.

When a thermal CVD method is used, porous glass films can be successfully formed by setting the temperature of substrates to a level lower than that of the temperature used for manufacturing ordinary silica glass.

Porous glass films prepared by any of these methods are then subjected to the steps of immersion in a solution, drying and oxidization and sintering in a fluorine containing atmosphere to produce doped silica-based glass films which are co-doped with both a rare earth element and aluminum just as in the case of manufacturing rare earth doped optical fiber preforms.

Thereafter, the prepared doped silica glass films undergo micro-machining (for channel formation) and clad deposition processes in a known manner to produce rare earth doped optical waveguides as final products.

BEST MODES OF CARRYING OUT THE INVENTION

Now the present invention will be described further by way of examples that represent the best modes of carrying out the invention.

EXAMPLE 1

A number of porous preforms of pure silica glass having an average bulk density of 0.4 to $0.5 g/cm^3$ and prepared by means of a VAD method were immersed in different methylalcohol solutions containing erbium chloride and aluminum chloride at different concentrations for 12 to 24 hours for impregnation of these substances.

The Al/Er mol ratios of the solutions were between 1 and 5.

After impregnation, each of the porous glass preforms was dried to evaporate the solvent of the solution in which it had been immersed and then heated to approximately 950° C. in an oxygen gas flow in order to oxidize and fix the salts of erbium and aluminum remaining on the preform.

Thereafter, the porous glass preforms were subjected to a dehydrating process in a muffle tube of a vertical electric furnace filled with flowing helium gas containing $Cl_2$ and $O_2$ by 1 vol % and 10 vol % respectively and heated to 1,000° C. at the center of the furnace, where the porous glass preforms were introduced from above and moved to pass the heat zone of the electric furnace at a rate of 3 mm/min.

After dehydration, the preforms were retracted to a low temperature zone in the electric furnace while the temperature of the central zone of the furnace was raised to 1,300° C. and the composition of the helium gas flowing through the core tube was so modified as to contain $SiF_4$ by 0.5 to 10 vol %.

Under this sintering condition, the porous glass preforms were moved again toward the center of the furnace at a rate of 2 mm/min for sintering to obtain $Er_2O_3$—$Al_2O_3$—$SiO_2$—F glass rods which were co-doped with both Er and Al to different concentrations.

Of the as-sintered preforms, those doped with Er and/or Al to a concentration above approximately 3,000 ppmw (parts per million by weight) were observed to have lost transparency and show an appearance of pinkish opal glass.

Figure 3:
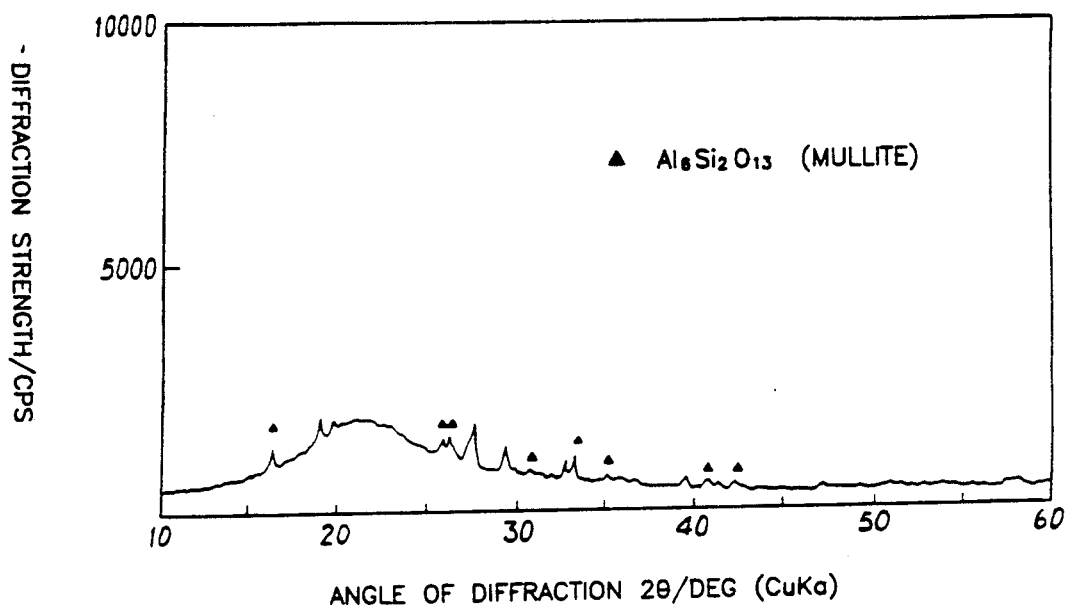
FIG. 3 is an X-ray diffraction pattern of a sintered preform obtained by a method according to the invention.

FIG. 3 shows an X-ray diffraction pattern of a preform that lost transparency after sintering.

As FIG. 3 show, the preform clearly exhibited a halo pattern which was centered at a diffraction angle of $2\theta = 22°$.

Figure 1:
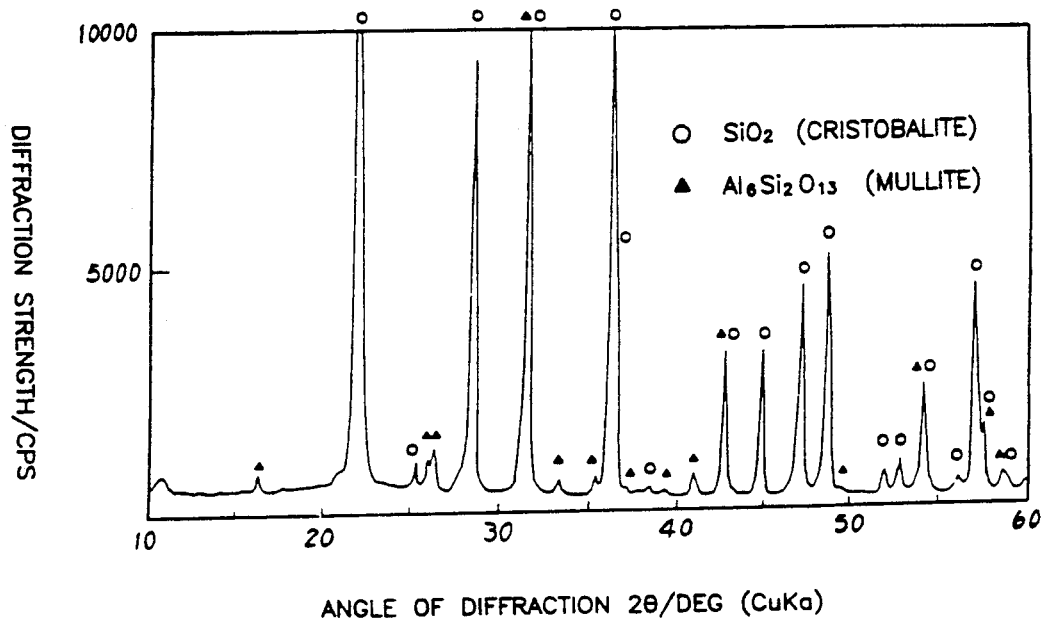
FIG. 1 is an X-ray diffraction pattern of a sintered preform obtained in Experiment 1.
Figure 2:
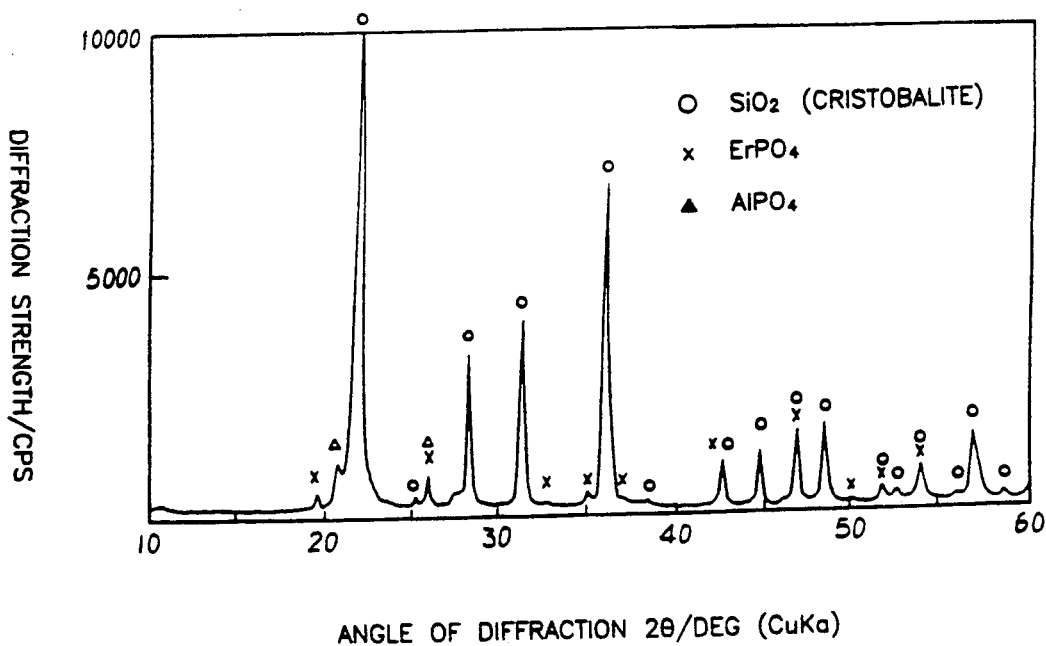
FIG. 2 is an X-ray diffraction pattern of a sintered preform obtained in Experiment 1.

Besides, the intensity of diffraction of the remaining crystal phase (containing mullite and other unidentified substances) of the preform of FIG. 3 was smaller than those of the preforms of FIGS. 1 and 2.

These evidences prove that the preform of FIG. 3 was composed of a glass phase to a large extent.

The obtained preforms were then set on glass lathes and heated by oxygen hydrogen flames. The heated preforms turned transparent very quickly to produce glass rods without air bubbles.

Thereafter, a clad glass layer of fluorine doped silica was formed on the outer periphery of each of the glass rods by a method principally based on OVD method and then the glass rods were heated and elongated to obtain single mode optical fibers having a core diameter of 7.5 μm, an outer diameter of 125 μm and numerical aperture of 0.12.

The glass composition and some of the characteristics of a number of samples of the cores of the produced optical fibers are listed in Table 2.

In Table 2, "residual Al ratio" is expressed by $C_2/C_1 \times 100$, where $C_1$ is the aluminum concentration in the porous glass preforms after solution impregnation and drying and $C_2$ is the aluminum concentration in the preforms after sintering.

In Table 2, Sample No. 5 is a single mode optical fiber having a core of pure silica host doped with erbium to a concentration of 900 ppmw and listed here for the purpose of comparison.

It is seen in Table 2 that an optical fiber doped with erbium to approximately 5,000 ppmw (No. 4) has a fluorescence life time of approximately 9.7 msec for a wavelength of 1.55 μm, which is comparable to that of an optical fiber with a low erbium concentration (No. 5). The transmission loss of the samples is found between 3 and 12 dB/km and satisfactorily low.

From these facts, rare earth element doped silica glass according to the invention is particularly suited for active optical devices.

EXAMPLE 2

A number of $GeP_2$—$SiO_2$ porous preforms having a $GeO_2$ concentration of 6 to 26 wt % and an average bulk density of 0.4 to 0.7 g/cm$^3$ were prepared by means of a VAD method.

The porous glass preforms were immersed in different methylalcohol solutions containing erbium or neodymium chloride and aluminum chloride at different concentrations for appropriate impregnation of these substances.

Then, the preforms were dried and the dopants remaining in the preforms were oxidized in a manner similar to that of Example 1.

Thereafter, the preforms were divided into two groups and subjected to dehydration, fluorine doping and sintering in a furnace respectively under Conditions (1) and (2) as described below.

Condition (1)

During the process of dehydration, fluorine doping and sintering of the porous glass preforms, the furnace was filled with flowing He gas containing $SiF_4$ by 3 vol % and the preforms were moved at a rate of 3 mm/min. The remaining particulars of the condition were same as those of Example 1.

Condition (2)

Initially, the porous glass preforms were moved at a rate of 3 mm/min for fluorine doping through the heat zone of the vertical electric furnace which was filled with flowing He gas containing $SiF_4$ by 1 to 10 vol % and whose central area was maintained to 1,000° C. Then, the preforms were retracted to a low temperature zone and subsequently, after modifying the composition of the He gas in the furnace to contain $Cl_2$ by 1 vol % and $O_2$ by 10 vol % and raising the temperature of the central area to 1,300° C., moved back to the heat zone at a rate of 3 mm/min for simultaneous dehydration and sintering.

In this way, $Er_2O_3$—(or $Nd_2O_3$)-$Al_2O_3$—$GeO_2$—$SiO_2$—F glass rods were obtained.

While some of the obtained preforms had lost the transparency obviously because of the processing conditions, they immediately recovered the transparency when heated by oxygen-hydrogen flames.

Some of the preforms are listed in Table 3.

By comparing Table 3 with Table 2, it may be understood that the glass rods prepared in Example 2 showed a "residual Al ratio" which is greater than those of the samples of Example 1.

This fact evidences that addition of $GeO_2$ to a preform can suppress dissipation of $AlF_3$ from the preform.

It should be noted that the preforms prepared by way of Route (2) generally showed a residual Al ration higher than that of the preforms prepared by way of Route (1).

Thereafter, a clad glass layer of fluorine doped silica was formed on the outer periphery of each of the glass rods, which were then heated and elongated to produce single mode optical fibers having a core diameter of 2 to 6 μm and an outer diameter of 125 m as in the case of Example 1.

The obtained optical fibers showed excellent fluorescence and transmission characteristics as in the case of Example 1.

Sample No. 5 in Table 3 is a specimen where excessive fluorine was added and consequently a large number of air bubbles were formed along the core-clad interface at the time of clad formation.

Cracks due to thermal stress were found along the core-clad interface of sample No. 11 in Table 3 containing $GeO_2$ at a high concentration level of 26 wt % after the formation of clad glass. Because of this defect, the sample was removed from the succeeding processes of producing optical fibers.

Preforms containing $GeO_2$ to a concentration level lower than 20 wt % did not show any problem of crack generation.

Figure 4:
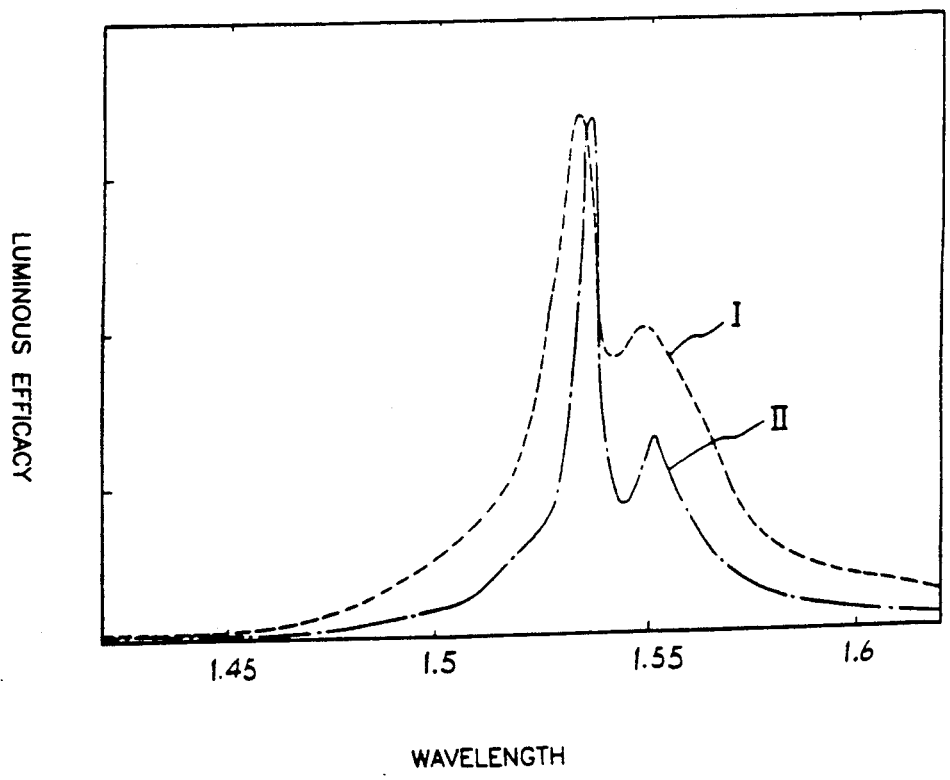
FIG. 4 is spontaneous emission spectra of two different Er-doped optical fibers obtained by a method according to the invention and explained in Example 2.

In FIG. 4, curve I indicates a spontaneous emission spectrum around the wavelength of 1.55 μM of the optical fiber obtained from Sample No. 1 in Table 3.

In this measurement, a titanium-doped sapphire laser operating at the wavelength of 0.98 μm was employed for a pump light source. The fiber length and the launched pump power were set to be 10 cm long and 30 mW respectively.

In FIG. 4, curve II indicates a spontaneous emission spectrum of a single mode optical fiber having a core of $GeO_2$—$SiO_2$ host glass doped with erbium to a concentration of 900 ppmw and is shown here for comparison with curve I.

It is obvious from FIG. 4 that the sample in question has a light emission spectrum much broader than that of the optical fiber of curve II, indicating that the samples of Example 2 had a very broad amplification bandwidth.

Figure 5A:
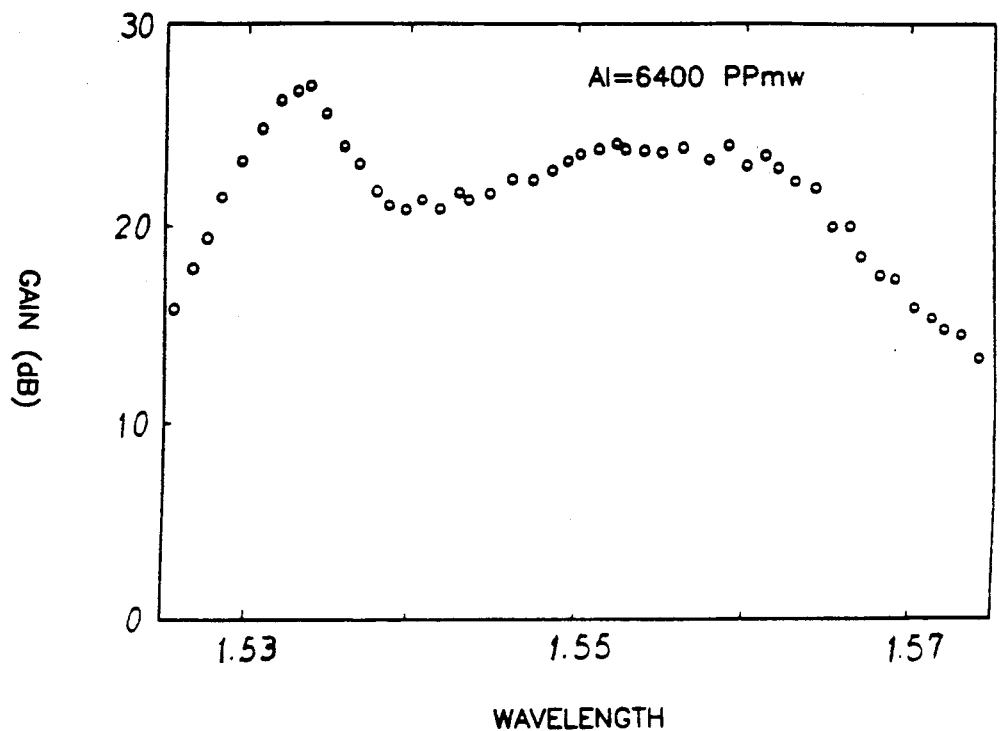
FIGS. 5(a) and 5(b) are gain spectra the Er-doped optical fibers of FIG. 4.
Figure 5B:
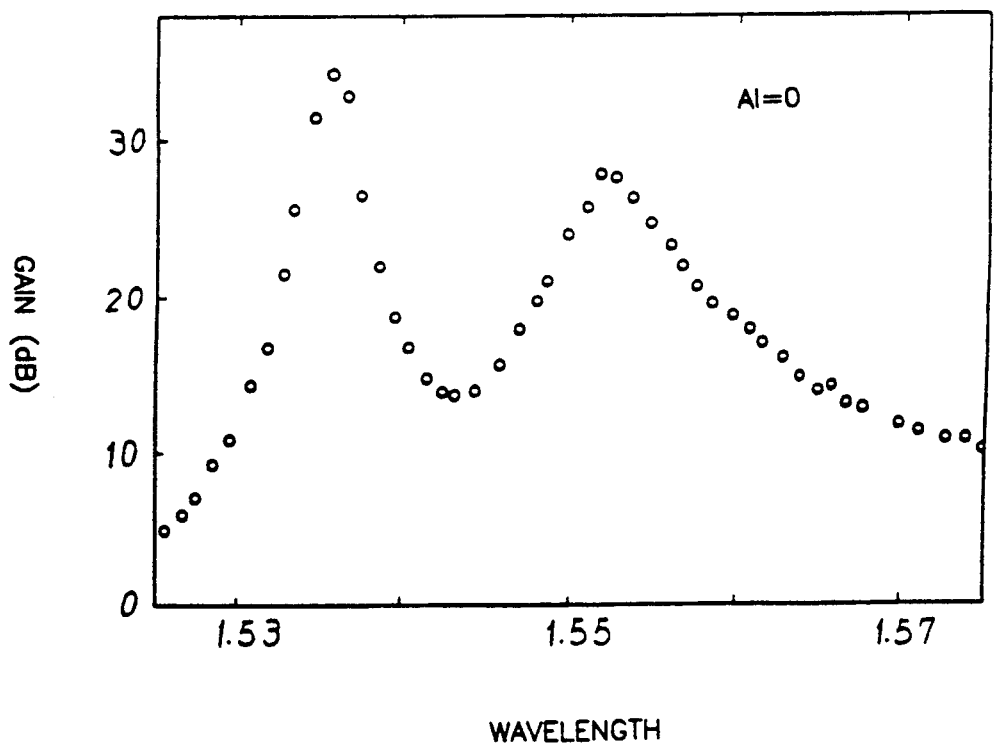

FIG. 5(a) shows a gain spectrum of the optical fiber obtained from Sample No. 7 in Table 3, while FIG. 5(b) shows a gain spectrum of an optical fiber prepared from a piece of $GeO_2$—$SiO_2$ host glass containing no aluminum.

The optical fibers whose gain spectra were shown in FIGS. 5(a) and 5(b) had an equal Er concentration, an equal core diameter and an equal length of 42 ppmw, 3.3 μm and 220 m respectively. A laser diode having a wavelength of 1.48 μm and an incident power of 13 mW was used as pump light source for each of them.

It is seen from FIGS. 5(a) and 5(b) that the optical fiber of FIG. 5(b) containing no aluminum showed an gain spectrum having two peaks separated by a large dip around 1.54 μm, whereas the aluminum doped optical fiber of FIG. 5(a) had no dip and produced evenly distributed amplification gains of greater than 20 dB over a bandwidth of 29 nm which was centered at 1.551 μm, the differences among the gains being not greater than 3 dB.

While transparent glass rods co-doped with erbium and aluminum to respective concentration levels of approximately 40,000 ppmw and 30,000 ppmw, these figures do not necessarily define the threshold values for vitrification.

For instance, transparent glass rods containing aluminum as densely as about 80,000 ppmw may be made.

EXAMPLE 3

A porous pure silica glass layer having an average bulk density of 0.4 to 0.7 g/cm³ was formed on the outer periphery of each of a number of $GeO_2$—$SiO_2$ transparent glass rods by means of an OVD method.

The porous glass layers were immersed in different methylalcohol solutions containing erbium chloride and aluminum chloride at different concentrations for appropriate impregnation of these substances. Then, they were dried and treated for oxidization of the remaining dopants and dehydration in a manner similar to that of Example 1.

After dehydration, the glass rods were moved to traverse an electric furnace at a rate of 2.5 mm/min to sinter the porous glass layers in the furnace which was heated to 1,400° C. at the center and filled with a He gas atmosphere containing 0.5 to 10 vol % of $SiF_4$.

Thereafter, the glass rods were heated and elongated and again a porous pure silica glass layer was formed on the outer periphery of each of them by means of an OVD method. Then, the processes from the solution impregnation to the sintering were repeated to produce optical fiber preforms each having a core of $GeO_2$—$SiO_2$ glass and a clad layer of $Er_2O_3$—$AL_2O_3$—$SiO_2$—F glass formed on the outer periphery of the core.

A single mode optical fiber made from an optical fiber preform having a clad glass layer co-doped with both erbium and aluminum as described above can be advantageously used for a fused taper coupler provided with features of an optical amplifier.

EXAMPLE 4

A clad layer of $P_2O_5$—$SiO_2$—F glass having a refractive index slightly lower than that of silica glass was deposited on each of a number of silica glass tube having an outer diameter of 20 mm and an inner diameter of 17 mm by means of MCVD method and subsequently a porous core glass layer of $GeO_2$—$SiO_2$ glass was deposited on the inner periphery of the clad glass layer under a reduced temperature by means of MCVD method.

It may be needless to say that, with these MCVD methods, a silica glass tube is set on a glass lathe.

Thereafter, the silica glass tubes were taken out of the glass lathes and immersed in different methylalcohol solutions containing erbium chloride and aluminum chloride at different concentrations so that the pores were impregnated with the solutions.

After impregnation, the solutions were evaporated to dry the porous core glass layers.

After the drying process, the silica glass tubes were set on the glass lathes again and oxygen ($O_2$) gas was made to flow through the silica glass tubes, which were heated from outside by oxygen hydrogen flame burners to oxidize the salts of erbium and aluminum deposited in the pores of the porous core glass layers.

During this process of oxidization, the flames of the oxygen hydrogen flame burners were gradually intensified until the temperature of the heated areas got to 800° C. while the burners were reciprocally moved along the respective silica glass tubes.

Then, the oxygen gas flows were replaced by flows of He gas containing 1 to 3 vol % of $SiF_4$ and the silica glass tubes were heated to 1,000° C. to dope the porous core glass layers with fluorine.

Subsequently, the He gas was modified to contain 1 vol % of $Cl_2$ and 5 vol % of $O_2$. Then, each of the porous core glass layers was consolidated by a single traversing movement of the related oxygen-hydrogen flame burner by adjusting the flame intensity and the traversing speed of the burner while the temperature of the heated areas was raised to 1,600° C.

Thereafter, the silica glass tubes were fiercely heated and collapsed to produce solid and rod-shaped optical fiber preforms in the usual way.

The obtained transparent preforms of Example 4 had a core glass layer co-doped both with erbium and aluminum to respective concentration levels of 40,000 ppmw and 80,000 ppmw.

While erbium and neodymium which are two popular rare earth elements for optical amplifiers and laser devices were used for the above described examples, the rare earth elements that can be used for the purpose of the present invention are not limited to them and other elements may be appropriately used.

It is a well known fact that the rare earth elements have similar chemical properties and chemically resemble with one another and that erbium can be located near the center of the yttrium group including Yttrium (Y) having an atomic number of 39 and the elements with atomic numbers 63 through 71 (Eu through Lu) while neodymium is found near the center of the cerium group with atomic number 57 through 62 (La through Sm) from the point of view of the present invention.

Therefore, erbium and neodymium may be safely replaced with elements from the respective groups without entailing any problem for the purpose of the present invention.

Besides, porous glass members prepared by means of established or known sol-gel method, split cast method or powder molding method may be appropriately used with the technique of solution impregnation for the purpose of the invention.

INDUSTRIAL APPLICABILITY

Rare earth element doped silica glass according to the invention is prepared by doping silica-based glass with a rare earth element, aluminum and fluorine.

Because of the coexistence of a rare earth element and aluminum in such rare earth element doped silica glass, the rare earth element can be added to the glass to a high concentration level without damaging the light emission characteristics of the glass to ensure a sufficiently high amplification gain even if the effective length for exciting light is relatively short. Consequently, a compact light amplifier can be realized by using such glass.

Particularly when the rare earth element used for doping is erbium, the effective wavelength bandwidth of such a light amplifier is significantly broadened at and near 1.5 μm to make the light amplifier useful for a variety of applications.

Since rare earth element doped silica glass according to the invention contains silica to a large proportion and no alkaline metals at all, its coefficient of thermal expansion, softening temperature and other physical properties are close to those of silica-based glass used for ordinary optical fibers and therefore can be easily fused with such silica-based glass.

Therefore, optical fibers (and optical waveguides) having a core clad structure whose core and clad are respectively made of rare earth element doped silica glass according to the invention and glass having a relatively low refractive index and made of fluorine doped silica, for instance, and which is capable of being spliced well with ordinary silica-based optical fibers can be manufactured without difficulty.

As described above, since rare earth element doped silica glass according to the invention is doped with a rare earth element and aluminum and additionally with fluorine, the crystallization tendency of the porous silica-based glass impregnated with a rare earth element and aluminum is successfully suppressed and hence the porous glass preforms can be easily consolidated at a temperature below 1,500° C.

Thus, an appropriate outside process may be selected for manufacture of porous glass preforms, which are then sintered at relatively low temperature to produce doped silica glass which is transparent and totally free from air bubbles.

As a method for manufacturing rare earth doped silica glass according to the invention combines means for producing articles made of porous glass and a solution impregnation method, it provides easy and effective means for manufacturing rare earth doped silica-based glass which is co-doped with both a rare earth element and aluminum and highly transparent and therefore can be used as a suitable material for fiber-, rod- and film-shaped active optical devices.

TABLE 1

| crystallized fluoride | melting point (°C.) |
|---|---|
| $AlF_3$ | 1,040 |
| $LaF_3$ | 1,493 |
| $CeF_3$ | 1,430 |
| $PrF_3$ | 1,395 |
| $NdF_3$ | 1,374 |
| $SmF_3$ | 1,306 |
| $EuF_3$ | 1,276 |
| $GdF_3$ | 1,231 |
| $TbF_3$ | 1,172 |
| $DyF_3$ | 1,154 |
| $HoF_3$ | 1,143 |
| $ErF_3$ | 1,140 |
| $TmF_3$ | 1,158 |
| $YbF_3$ | 1,157 |
| $LuF_3$ | 1,182 |
| $YF_3$ | 1,144 |

TABLE 2

| No. | Er ppm | Al ppm | F wt % | residual Al ratio % | fluorescence life span ms | loss dB/km |
|---|---|---|---|---|---|---|
| 1 | 1,200 | 950 | 0.61 | 19.4 | 10.6 | 3.3 |
| 2 | 5,400 | 810 | 0.60 | 17.6 | 10.4 | 3.5 |
| 3 | 5,000 | 3,600 | 0.60 | 16.6 | 9.7 | 12 |
| 4 | 22,000 | 15,000 | 1.3 | not measured | not measured | not measured |
| 5 | 900 | — | — | — | 11.0 | 2.0 |

N.B. The figures in the "No." column in the table indicate the serial numbers of the samples which were optical fibers and preforms. The figures in the "Er", "Al" and "F" columns indicate the concentrations of these dopants in the samples. The figures in the "loss column" indicate the measured transmission loss values for a wavelength of 1.1 μm.

TABLE 3

| preform No. | Er conc. ppm | Nd conc. ppm | Al conc. ppm | $GeO_2$ conc. wt % | F conc. wt % | sintering route | residual Al ratio % |
|---|---|---|---|---|---|---|---|
| 1 | 800 | — | 910 | 9 | 0.97 | (1) | 22.8 |
| 2 | 4,600 | — | 4,400 | 9 | 0.60 | (1) | 22.6 |
| 3 | — | 180 | 580 | 9 | 1.0 | (1) | 24.4 |
| 4 | 260 | — | 6,500 | 6 | 0.38 | (2) | 32.8 |
| 5 | 40,000 | — | 30,000 | 6 | 1.8 | (2) | 65.8 |
| 6 | 240 | — | 610 | 9 | 0.16 | (2) | 26.6 |
| 7 | 1,500 | — | 15,000 | 9 | 0.65 | (2) | 36.0 |
| 8 | 250 | — | 5,000 | 13 | 0.73 | (2) | 27.1 |
| 9 | 43 | — | 6,400 | 15 | 0.28 | (2) | 30.3 |
| 10 | 39 | — | 3,400 | 18 | 0.27 | (2) | 26.3 |
| 11 | 42 | — | 7,400 | 26 | 0.57 | (2) | 26.9 |

What is claimed is:

1. Rare earth element doped silica glass characterized in that said glass is prepared by doping $SiO_2$ glass which is co-doped with both aluminum and fluorine additionally with a rare earth element.

2. Rare earth element doped silica glass according to claim 1, wherein said doped glass contains a refractive index raising substance and/or a softening temperature lowering substance.

3. Rare earth element doped silica glass characterized in that it is prepared by doping $GeO_2$—$SiO_2$ glass which is co-doped with both aluminum and fluorine additionally with a rare earth element.

4. Rare earth element doped silica glass according to claim 1, wherein said doped glass contains fluorine in an amount of approximately 0.1 to 1.5% by weight.

5. Rare earth element doped silica glass according to claim 3, wherein said doped glass contains $GeO_2$ in an amount of less than about 20% by weight.

6. Rare earth element doped silica glass according to claims 1, wherein the rare earth element to be used for additionally doping the doped glass is erbium or neodymium.

7. Rare earth element doped silica glass according to claim 1, wherein the doped glass contains a rare earth element at a concentration level of less than about 40,000ppm by weight and aluminum at a concentration level of less than about 50,000 ppm by weight.

8. A method for manufacturing rare earth element doped silica glass comprising the steps of impregnating a porous glass preform with a rare earth element and aluminum by immersing the preform in a solution containing ions of a rare earth element and aluminum, drying said preform while causing the salts of the rare earth element and aluminum to deposit on the pores of the preform and sintering the porous glass preform after the drying step to remove the pores from the preform, characterized in that said method further comprises a fluorine doping step after said drying step and before completion of consolidation of the preform in the sintering step where the porous glass preform is heated and doped with fluorine in a fluorine containing atmosphere.

9. A method for manufacturing rare earth element doped silica glass according to claim 8, wherein it further comprises a dehydrating step where said porous glass preform is dehydrated in a chlorine gas and oxygen containing atmosphere.

10. A method for manufacturing rare earth element doped silica glass according to claim 8, wherein said fluorine doping step is conducted in a fluorine containing atmosphere at a temperature lower than the sublimation temperature of aluminum fluoride.

11. A method for manufacturing rare earth element doped silica glass according to claim 8, wherein the porous glass preform is prepared by means of a vapor phase method, a sol-gel method, a powder molding method or a split cast method.

12. A method for manufacturing rare earth element doped silica glass according to claim 8, wherein the porous glass preforms has a composition that allows the pores to be wiped out of the preforms and make them solid at or below $1,587° \pm 10°$ C. which is the eutectic point of mullite and crystobalite.

13. A method for manufacturing rare earth element doped quartz glass according to claim 8, further comprising the step of oxidizing the deposited salts for stabilization after the drying step, but before the fluorine doping step.

* * * * *